United States Patent
Mayers

(10) Patent No.: US 9,418,366 B1
(45) Date of Patent: Aug. 16, 2016

(54) AD PAYMENT FOR PHYSICAL PRESENCE

(75) Inventor: Eric Mayers, Hayward, CA (US)

(73) Assignee: Google Inc., Mountain View, CA (US)

( * ) Notice: Subject to any disclaimer, the term of this patent is extended or adjusted under 35 U.S.C. 154(b) by 726 days.

(21) Appl. No.: 11/694,600

(22) Filed: Mar. 30, 2007

(51) Int. Cl.
  *G06Q 30/00* (2012.01)
  *H04M 11/00* (2006.01)

(52) U.S. Cl.
  CPC .................................... *G06Q 30/00* (2013.01)

(58) Field of Classification Search
  CPC ............................... H04W 4/24; H04M 15/41
  USPC ........................................... 455/406; 705/14
  See application file for complete search history.

(56) References Cited

U.S. PATENT DOCUMENTS

| | | | |
|---|---|---|---|
| 2002/0102993 A1* | 8/2002 | Hendrey et al. | 455/456 |
| 2004/0186769 A1* | 9/2004 | Mangold et al. | 705/14 |
| 2006/0041538 A1* | 2/2006 | King et al. | 707/3 |
| 2007/0050249 A1* | 3/2007 | Huang et al. | 705/14 |
| 2007/0061057 A1* | 3/2007 | Huang et al. | 701/23 |
| 2007/0185768 A1* | 8/2007 | Vengroff et al. | 705/14 |
| 2008/0248815 A1 | 10/2008 | Busch | |

* cited by examiner

*Primary Examiner* — Omoniyi Obayanju
(74) *Attorney, Agent, or Firm* — Fish & Richardson P.C.

(57) ABSTRACT

A computer-implemented method of determining reaction to promotional items includes providing to a mobile device a promotional item associated with a geographic location, determining whether the mobile device is proximate to the geographic location, and charging an advertising account if the mobile device is proximate to the geographic location.

25 Claims, 7 Drawing Sheets

| Ad ID 502 | Impression Time Stamp 504 | Coordinates 506 | Radius 508 | Stop Time 510 | Active? 512 | Visit 514 |
| --- | --- | --- | --- | --- | --- | --- |
| 0246314 | 10-20-2006 14:03:01 | (44.92497, -93.40018) | 50 | 5 | N | Y |
| 1341789 | 10-20-2006 14:03:48 | (44.93628, -93.40644) | 200 | 10 | N | N |
| 9213148 | 10-20-2006 14:09:22 | (44.94395, -93.41267) | 200 | 10 | N | N |
| 2111328 | 10-20-2006 14:10:05 | | 100 | 15 | N | N |
| 2714623 | 10-20-2006 14:10:24 | (44.93028, -93.40986) | 50 | 15 | N | Y |
| 1412312 | 10-21-2006 06:15:46 | (44.90262, -93.39700) | 50 | 5 | Y | N |
| 0034123 | 10-21-2006 08:16:12 | | 150 | 5 | Y | N |
| 4132147 | 10-21-2006 08:16:56 | (44.93028, -93.40986) | 50 | 10 | Y | N |
| 5766110 | 10-21-2006 08:34:04 | | 100 | 5 | Y | N |

FIG. 5

AD PAYMENT FOR PHYSICAL PRESENCE

TECHNICAL FIELD

This disclosure relates to systems and techniques for tracking responses to advertisements provided to mobile devices.

BACKGROUND

People with connections to the internet may now receive many useful services, such as maps, comparison shopping information, e-mail, search results, business software applications, and financial and blogging information. Often, such information may be obtained for free—such as with the various services offered by Google. But providing such services costs a lot of money. As a result, the content that is delivered to users of such internet services is often accompanied by advertising in various forms, to offset the cost of providing the content.

Advertisers can pay simply to have their promotional materials displayed, or they can track reactions to advertisements and pay according to that reaction. For example, advertisers may have their advertisements displayed for free, and may be charged only if a user clicks on a hyperlink in an ad—a so-called "pay-per-click" system. Advertisers may also be permitted to select an amount they are willing to pay for each click so as to improve the position of their advertisements relative to advertisements of other advertisers. The position of an advertisement, such as when it is displayed next to search results, may be a function of such a bid and the suitability of the ad, such as may be measured by the frequency with which users click on the advertisement. In this manner, advertisements that are not of interest to users will sink in the rankings, while those on which users click a lot will rise—even if the latter advertisements involve lower bid prices than do the former. The popular Google AdWords program uses such an approach.

SUMMARY

This document discusses systems and methods that provide for advertisement payment via physical presence, as may be relevant to users of mobile devices like vehicle navigation systems and mobile telephones. For example, a user may be presented with advertisements for businesses in the user's vicinity (as determined, e.g., by coordinates of a GPS-enabled mobile device) and an advertiser may be billed if the user visits the advertiser's business, as determined by whether the user's mobile device comes sufficiently close to the business, and perhaps stays in that location for period of time sufficient to indicate that the user is not simply passing by.

In one implementation, a computer-implemented method of determining reaction to promotional items is disclosed. The method comprises providing to a mobile device a promotional item associated with a geographic location, determining whether a user of the mobile device takes action to navigate to the geographic location, and charging an advertising account if the user of the mobile device takes action to navigate to the geographic location. The act of determining whether the user takes action to navigate to the geographic location may comprise determining whether the mobile device becomes proximate to the geographic location, and may also comprise determining whether the user activates a navigation system in response to the provision of the promotional item. The geographical location may include a region defined as a circle having a centerpoint and a radius or diameter. The promotional item may be selected for the mobile device based on a location of the mobile device. In some aspects, the mobile device may comprise a vehicle navigation system.

The method may also comprise assigning a billing amount based on a level of user response to the promotional item, and the level of user response may be measured according to a distance traveled by the user to reach the geographic location. The billing amount can be assigned based on a user selection of an item and a user navigation to an item. In addition, the method may comprise providing directions to the geographic location, and may also include receiving a request from the device and providing the promotional item in response to the request, wherein the promotional item has a content relating to content of the request. In addition, the method may also comprise receiving a request from the device and providing the promotional item in response to the request, wherein the promotional item has a content relating to content of the request. The method may also include determining an approximate distance traveled by the device after the promotional item is provided, and charging the advertising account an amount related to the determined distance.

In yet another implementation, a system for determining reaction to promotional items is described. The system comprises a database storing a plurality of promotional items having associated geographic locations, an advertising server that selects one or more promotional items in response to a request, wherein the promotional items are selected based on the content of the request and a geographic location associated with the request, and a billing engine adapted to bill an entity associated with a promotional item if a device to which the promotional item is delivered comes into proximity with a geographic location associated with the promotional item. The geographic locations can be expressed as latitude/longitude pairs, and one or more of the promotional items can be associated with a plurality of geographic locations. The billing engine may further be adapted to bill the entity associated with the one or more promotional items associated with a plurality of geographic locations if a device comes into proximity of any of the geographic locations.

In some aspects, the geographic location associated with the request may include a location of the device. Also, the billing engine may be programmed to assign a billing amount based on a level of user response to the promotional item, and the promotional item may be provided in response to a query by a user of the mobile device. The system may also include a mapping server configured to provide directions to the geographic location.

In another implementation, a computer-implemented method of tracking reaction to electronic advertising is disclosed. The method includes providing an advertisement for review by a user of a mobile electronic device, sensing the physical presence of the mobile device at or near a location associated with the advertisement, and billing a sponsor of the advertisement if the mobile device is sensed at or near the location associated with the advertisement. The sensing of the mobile device at or near the location may be determined by the mobile device or by a computing system remote from the mobile device.

In yet another implementation, a system for determining reaction to promotional items is disclosed and includes a database storing a plurality of promotional items having associated geographic locations, an advertising server that selects one or more promotional items in response to a request, wherein the promotional items are selected based on the content of the request and a geographic location associated with the request, and means for charging entities associated with the promotional items.

The details of one or more embodiments are set forth in the accompanying drawings and the description below. Other features, objects, and advantages will be apparent from the description and drawings, and from the claims.

DESCRIPTION OF DRAWINGS

FIG. 5 is a schematic representation of a database for tracking responses to advertisements.

Like reference symbols in the various drawings indicate like elements.

DETAILED DESCRIPTION

The systems and techniques described here relate to determining when (and in some circumstances how much) an advertiser may be charged for particular actions by those people who are presented with advertisements. The techniques may be employed, for example, to provide advertisements to mobile consumers, such as via mobile telephone or automotive navigation systems, and to charge advertisers when a system is able to infer that a mobile consumer has responded to the advertisement by going to a particular location, such as a store or other facility associated with an advertiser.

Figure 1:
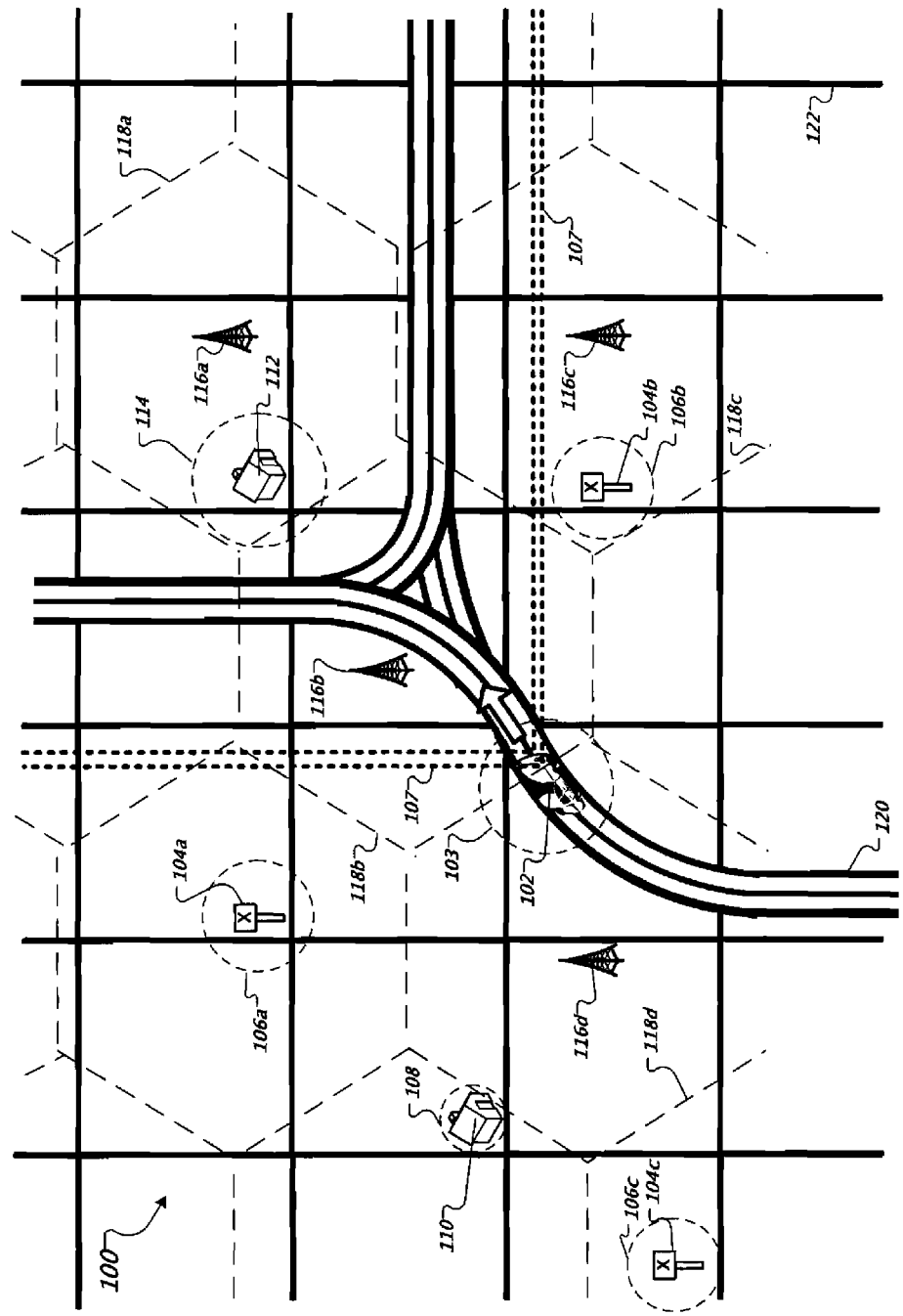
FIG. 1 shows a conceptual map of locations associated with advertisements that may be transmitted to a user of a mobile device.

FIG. 1 shows a conceptual map 100 of locations associated with advertisements that may be transmitted to a user of a mobile device. In this representation, the user and the mobile device are in a vehicle 102, traveling northeast on highway 120. The mobile device may be, for example, a personal digital assistant (PDA), a smart phone, a vehicle navigation system, or similar mobile device. While driving through the illustrated area, the user may be interested in finding products or services of interest, such as a restaurant for dinner. Elements like those displayed on the map 100 may be displayed on a vehicle navigation screen to allow a user to identify where certain venues are relative to their vehicle, and to navigate toward those venues.

Information about one or more such restaurants or other facilities may be provided to the user through the mobile device, such as in the form of advertisements, and the advertisers may be billed or charged either when the user selects a particular advertisement, and/or when the user visits a store or other venue associated with the advertisement. As explained in more detail below, the fact of a user's visit to a store or other venue may be determined by identifying situations in which the mobile device stays within the vicinity of a particular store or other venue for a particular period of time. Such activity may be assumed to indicate that the user visited the store or other venue, and a vendor may agree to pay an advertising rate for such activity in a manner similar to advertisers agreeing to pay for clicks by users in more traditional web-based advertising.

As shown in the figure, vehicle 102 passes through areas in which are located facilities of organizations that may wish to draw customers from the surrounding area. For example, facilities 104a-104c may represent a number of coffeehouses from a chain that are spread across a city. The organization operating the coffeehouses may wish to draw customers from surrounding areas for spur-of-the-moment purchases. The organization may therefore register the locations of each of its facilities 104a-104c with a central information provider, such as the Google search engine. Such registration may occur as part of the organization signing up for an advertising program, such as the well-known Google Adwords or Adsense programs.

In registering with an advertising program, the organization may provide contact information and other general information, and may also provide information that is specific to particular advertisements. For example, the organization may provide key words that may trigger the display of advertisements to users. As one example, a coffee chain may identify key words such as "coffee," "refreshments," and "snacks." The organization may also provide copy for an advertisement to be displayed to a user, such as text, graphics, audio, or video. The copy may also include a graphic (e.g., an icon) that is correlated to appear on a map in the location of a facility associated with the advertiser, such as a restaurant, gym, or other store. The key words may be matched against queries entered by a mobile user's device, so that when the user enters a term such as "coffee," the organization's corresponding advertisement is identified as a match for the query, and the advertising copy identified by the organization is presented to the user. Alternatively, advertisements may be generated solely in response to the identification of location information for a mobile device, such as when icons representing an advertiser's facilities are shown on a vehicle navigation display, without need for a user query.

In one example, the name of the organization may be displayed to a user along with text that describes the organization's product or services. A user may then select part of the presented information, such as a hyperlink, to obtain more information about the organization. For example, the user may be provided with a click-to-call link, whose selection will result in the user's mobile device initiating a communication session, such as a telephone call, with the organization or with a facility operated by the organization, such as by calling the closest coffee shop operated by the organization. Alternatively, selection of an advertisement may result in identifiers (e.g., on-screen icons) for each of the organization's facilities being displayed on a map on the mobile device. Where a vehicle navigation system includes the mobile device, the logo of the coffee house may be shown at various locations on the map, and the user may choose to perform a click-to-call operation (which may be carried out by a voice recognition process so that the user may keep their hands on the wheel).

Identifiers for particular facilities may also be displayed on a map in response to a query, without the need for a user to first select a search result or an advertisement. For example, as vehicle 102 moves along road 120, icons for subscribing businesses along the path and within the range shown on an electronic display may be displayed (and may be selected by clicking or by speaking). The mobile device may be provided with a location feature, such as a GPS receiver, so as to know the location of the vehicle 102, and may compare that location to the locations of various advertiser facilities to identify which facilities to show on the map at any given time. Such comparisons may happen continuously, or may occur only after the mobile device in vehicle 102 has stopped in a particular area for a certain period of time (e.g., a time period that is sufficiently longer than a typical traffic light stop).

The path or vector of vehicle 102 may also be used in selecting advertisements to display. For example, if a system in vehicle 102 submits a search term to which facility 112 and facility 108 are responsive, the advertisement for facility 112 may be displayed instead of, or be given an elevated score, relative to an advertisement for facility 108. That is because facility 112 is in the oncoming path of vehicle 102, and thus may be presumed to be more relevant to the driver of vehicle 102. Likewise, facility 104 may also be selected as more relevant than other areas behind vehicle 102, in part because it is on a street that is directly accessible from a road in front of vehicle 102. Relevance may also be assessed by the distance between vehicle 102 and a facility.

Also, advertisements, whether made in response to a query or not, may be changed as vehicle 102 passes through an area, both to represent facilities in the vicinity of vehicle 102 (such as facilities in the area shown on a navigational display or in a larger zone), and to represent facilities in the vector of vehicle 102, such as those facilities that lie in a wedge 107 defined in front of the vehicle 102, or within a particular distance of an intersection that is within that wedge (such as for facility 104*b*).

Once an advertisement associated with a facility or facilities is presented to a user, the user's location with respect to the facility or facilities may be tracked to determine whether it is likely that the user visited the facility or facilities. For example, if the user spends a sufficient amount of time in an area near the facility, it may be inferred that the user visited the facility. Advertisers may be willing to pay for the display of an advertisement or may be willing to pay additional money for such display if it is possible to infer that the user visited the advertiser's facility as a result of seeing the advertisement. Also, a user may make a selection so as to activate a portion of the navigational device so that the device begins provide directions to a facility. Such an action by the user, or additional actions by the user of following the directions, may also indicate that the user has visited a facility, or has otherwise acted in a manner for which an advertiser is willing to pay a fee.

As shown in the figure, each of the facilities has an area defined around it that determines whether a user has made a visit or not. For example facilities 104*a*-104*c*, which in this example are coffee shops, may have areas 106*a*-106*c* of sufficient size to cover a store and its nearby parking lot. In this manner, a user may be determined to have visited the coffee shop if their mobile telephone entered the area or if their vehicle navigation system entered the area. By comparison, facility 108 has a smaller area 110 around it, which may be appropriate if it is a store in a strip mall or is another form of small store without a nearby parking area by which the presence of a vehicle would indicate that the driver of the vehicle has visited the facility 108. In a similar manner, facility 112 has an appropriately sized area 114 around it.

The size of the area around a facility that may trigger a determination that a consumer has visited the facility, may be set in various ways. For example, an advertiser may select the appropriate area. The amount that an advertiser pays may increase if the area is smaller, because such a smaller area may cause false negatives for actual visits by consumers, such as the parking of a vehicle in a parking lot near the facility. The size of the area may also be negotiated between an information provider and an advertiser. For example, a large chain of restaurants may identify an appropriate area that covers a restaurant and its surrounding parking lot. Alternatively, the size of a triggering area may be assigned by a category for an advertiser. For example, advertisers who are identified as restaurants may have a particular triggering area, while advertisers identified as retail stores may have a different area.

The presence of a mobile device at an advertiser facility may also be determined by defining an area around the device. In particular, a radius around the device may be defined, and if a location of an advertisement-related facility falls within that area, a visit may be inferred and the advertiser charged. In addition, both the device and the facility may have areas defined around them, and a visit may be inferred if the areas overlap for a sufficient time in whole or in part.

Additionally the "arrival" of a device to a target location may be determined by the navigation system's internal assessment that the device has arrived at its destination. For example, when a location is displayed and a user selects to be directed by the navigation system to the destination, the system may be programmed to log the arrival at the destination, or the completed or providing driving directions. The device may then immediately report the event of arrival, or may stored the log information and report it later, such as by "pushing" it to a remote system, or by responding to a "pull" request from the system.

Mechanisms may also be provided to avoid double counting for visits. For example, where an advertisement might be displayed simultaneously on a mobile telephone and a vehicle navigation system, and the telephone and navigation system simultaneously visit a particular advertiser, the system may charge the advertiser only once, inferring that the telephone and navigation system belong to the same consumer. Vector data for the devices may also be compared to confirm whether the devices are held by the same person (or by traveling companions), so that two visits cancel out only if the devices followed similar paths in a time period before the visit. Alternatively, or in addition, devices may be registered so that an information provider knows that a mobile phone belongs to the same consumer as a navigation system, and does not simultaneously charge for them.

The location of vehicle 102 may be computed in various manners when determining whether vehicle 102 has visited a particular facility. For example, a GPS transceiver in vehicle 102 may provide detailed location information. That information may be stored in the navigation system, and determinations about whether a visit has occurred may be made by the navigation system, or the data may be transmitted to an information provider that may make such a determination. Alternatively, a vehicle location may be identified by triangulation methods with respect to cellular telephone towers 116*a*-116*d* having coverage areas 118*a*-118*d*, by mechanisms that are known in the art. Where such methods provide a less precise location, other factors for inferring that a visit has been made may be employed to help reduce ambiguity. For example, a factor indicating the likelihood of a visit may be increased where vehicle 102 changes direction between the time it receives an advertisement and the time it moves into the vicinity of a facility. Also, a factor may be increased if the vehicle travels a long way from its location when an advertisement was displayed until it reaches an advertisement-related facility. In such situations, it may be inferred that the advertisement played a role in the user's decision to enter the area, and that the user visited the facility as a result.

Additionally, engaging a navigation system to guide a user to a target location, such as a facility associated with an advertiser, may alone (regardless of the occurrence of an arrival) be considered as a billing event. Thus, there may be multiple options available for billing, including (1) upon an iconic or terse display on a map, including as the result of a search; (2) upon a selection of such an iconic or terse form and viewing metadata about the facility such as store hours, menu, phone number, current wait time, inventory, etc.; (3) upon engaging a navigation system for guidance to a target location, e.g., clicking on "take me to this location"; (4) upon the following of a sufficient number of navigation cues so that it is reasonable to conclude the user has tried to travel to the location; and (5) upon arriving at the target location, as determined by the navigation system according to the path, or otherwise traveling within a defined proximity of the target location (e.g., so as to account for remote parking lots and the like).

As discussed above, the area 103 may also or alternatively be defined around the vehicle 102 in making determinations about where the vehicle has visited. For example, a mobile telephone may have a very small area defined around it, under the assumption that it will stay close to a consumer, and thus provide a precise indication of areas the consumer visits. On the other hand, a vehicle navigation system may have a larger area defined around it, under the assumption that a consumer may park the vehicle and move a distance away from it when visiting a facility. In such a manner, visits made by users of vehicle navigation systems may be more accurately determined by a system.

In addition, the system may be programmed to learn about common parking locations of users targeting a specific location and may expand, or suggest expansion of, the billing area. For example, logs may be analyzed to determine that certain stopping points or areas are associated with particular queries or query results for many instances across many users; such stopping points may then be associated with one or more results associated with the queries. As one example, many people may visit a store that is reachable only from a relatively remote parking lot. The billing area for the store, which may initially be small, may be expanded to include the parking lot, either by adding the area of the parking lot to the initial billing area for the store, or by expanding the radius of the billing area for the store (where the area is defined by a circle having a certain radius) to encompass the parking lot.

As one example of the operation of the system shown in FIG. 1, the driver of vehicle 102 may be in an unfamiliar area and may need to fill up on gasoline. The driver may speak the word "gasoline station" into the microphone on a Bluetooth-enabled vehicle navigation system, which may cause the system to query a local (i.e., located on the vehicle) or remote (e.g., located at an information provider) database to receive information about gasoline stations near vehicle 102. The system may return facility 112 as a result of the search, and may also return other results related to the key word of gasoline station. If, for example, vehicle 102 is a diesel-powered vehicle, its driver may provide a command to see more information about facility 112, such as whether the facility pumps diesel fuel. The driver may also speak a phrase such as "phone result one," to cause an automobile telephone system to call facility 112 so that the driver may determine what fuels are provided by facility 112. Depending on the configuration of the system, such actions may result in a charge by the information provider to the owner of facility 112.

The query for gasoline stations may also occur inferentially. For example, a vehicle navigation system may be programmed to always show locations of subscribing businesses in the vicinity of an automobile, or to display particular facilities only at certain times, such as showing coffee shops in the morning, and showing gas stations only when the gas gauge is below a quarter tank. In such situations, the query may be triggered by location information for the device alone.

The location of facility 112 may be associated with vehicle 102, so that if the location of vehicle 102 enters an area around facility 112 (or the facility 112 enters an areas around vehicle 102) for a predetermined period after the presentation of an advertisement, a business associated with facility 112 may be charged for such action. For example, a vehicle navigation system may contain a database for storing the locations of facilities that have been advertised in the previous 15 minutes, or a previous predetermined number of search results, including facility 112, so that if vehicle 102 enters the area around facility 112 during that period, the owner of facility 112 will be charged. If a previous charge was made for a response to the advertisement, that charge may be removed when the visit charge is added. Due to imprecision of GPS systems and the inherent difficulty of tracking intent of users, multiple geographically-targeted offers that are in close proximity may need to be eliminated (reduced to a single offering). In addition to mechanisms similar to those used for online advertisements, the circle of proximity used for billing may be another mechanism in which advertisers can choose to compete.

Where multiple facilities are associated with a particular advertisement, features may be provided to permit easier reporting and distribution of advertising charges for the advertiser. For example, a restaurant chain may subscribe to provide advertisements on mobile systems, and may invite its franchisees to be part of the program. The chain may then provide locations for all subscribing franchisees. When a user enters a search, all facilities in an area may be displayed. When the user visits one of the facilities, a system can record an identifier for the facility, such as when charging the advertiser. Such facility-specific information may then be made available to the advertiser chain, so that, for example, the chain can analyze facility-specific actions by consumers and/or can pass charges on to individual facilities.

Figure 2:
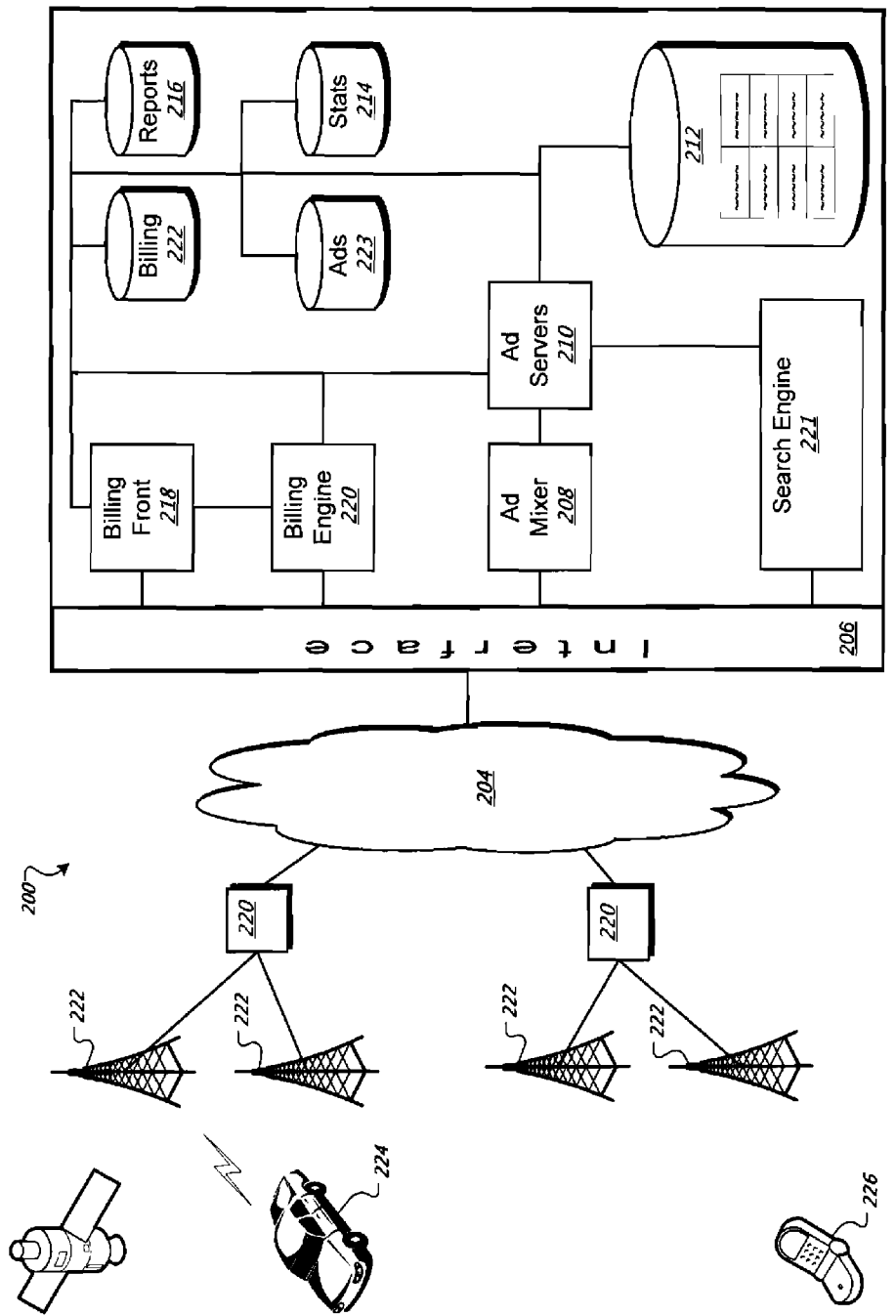
FIG. 2 is schematic diagram of a system for serving and receiving responses to geographically targeted advertisements.

FIG. 2 is a schematic diagram of a system 200 for serving and receiving responses to geographically targeted advertisements. In general, the system may be part of a larger system operated by an information service provider. The larger system may provide search results, shopping information, maps, images, banking, and other appropriate user services. System 200 may in turn interface with advertisers who wish to post advertisements to be delivered to users in exchange for being charged for such display (or for activities related to the display of advertisements, such as certain user responses to the advertisements). System 200 may include an information provider 202, which may be a system itself that interfaces with devices associated with various mobile users to supply the users with advertisements and to track the locations of the users' devices to determine whether, and how, they have responded to advertisements.

Information provider 202 may be connected to a network, such as internet 204, by interface 206. Interface 206 may include, for example, one or more Web servers or other appropriate computing structures. Interface 206 may serve to format documents or messages to be sent to various users, and may interpret requests or responses from users entered through user devices. User devices may include devices such as mobile telephone 226 and vehicle navigation system 224, which may be provided with location determining features such as GPS. The user devices may communicate wirelessly, for example, with wireless towers 222, which may provide for cellular data communications, WiFi networking, WiMax networking, or other appropriate communication protocols. The towers 222 may be connected to networks of particular information service providers, such as by gateways 220, through to the Internet 204.

Communications between information provider 202 and users may be provided by various appropriate methods.

Information provider 202 contains a number of components to assist in managing advertisements and determining user reactions to those advertisements. Search engine 221 may include structure and algorithms for responding to search requests presented by various devices, including mobile telephone 226 and vehicle navigation system 224. Such requests may be explicit, such as search requests entered by a user, or may be implicit, such as submissions by mobile telephone 226 or vehicle navigation system 224 regarding their locations. Also, a different search engine or different portions of search engine 221 may respond to explicit search requests as compared to implicit requests. For example, a specialized database may contain information about the location of particular advertisers who have paid to have their locations identified as users drive through an area. A specialized search engine may receive location information from remote users and may return information about advertisers in the user area to be displayed to the user. A separate search engine may be a more general search engine such as the general Google search engine, and may respond to explicit requests containing keywords from users, by providing search results and advertisements targeted to the key words and to the location of the user. In one example, the specialized database may be located locally on the mobile device, while the general search engine may be located on a central server system.

The operation of the search engine or search engines may take any appropriate form. In one implementation, the relevance of a document or item with respect to a particular search term or to other provided information may be determined by analyzing the level of "back links" to a document that contains matches for a search term. In particular, if a document is linked to (i.e., is the target of a hyperlink) by many other relevant documents (e.g., documents that also contain matches for the search terms), it can be inferred that the target document is particularly relevant. This inference may be made because the authors of the pointing documents presumably point, for the most part, to other documents that are relevant to their audience. If the pointing documents are in turn the targets of links from other relevant documents, they will be considered more relevant, and the first document can be considered particularly relevant because it is the target of relevant (or even highly relevant) documents. Such a technique may be the determinant of a document's relevance or one of multiple determinants. The technique is exemplified in the Google PageRank system, which treats a link form one web page to another as a "vote" for the latter page, so that the page with the most "votes" wins. Appropriate techniques may also be taken to identify and eliminate attempts to cast false votes so as to artificially drive up the relevance of a page.

Ad servers 210 may operate with, or parallel to, search engine 221. In effect, ad servers 210 may perform searches on a database of candidate advertisements. The advertisements may be textual, graphic, or other representations provided by advertisers or agents of advertisers, and may be associated with one or more key words or other identifiers. The key words may be matched against information provided by users, such as search queries, and ads may be identified as potentially relevant if the key words are a match or near match for an information request from a user device. For example, an ad having a keyword of "coffee" may be identified as potentially relevant as a response to a query for "Java."

Ad mixer 208 may receive potentially relevant advertisements from ad servers 210 and may select particular advertisements to be provided to a remote device, and also format the advertisements for display on such a device. For example, many different advertisements may contain a matching keyword for a user request including many advertisements in the vicinity of the user, but only a limited number of advertisements may be displayed on a mobile device. Ad mixer 208 may determine which of the potentially relevant advertisements should be displayed, and in what order, or at what time.

The selection of advertisements for display, such as with search results and other information, and the ordering of those advertisements, may be achieved by various techniques. In one exemplary technique, an initial determination is made to identify all advertisements that are a match or near match for the applied search terms or other query items or information. The match may be made, for example, between one or more words in a query, and key words identified by an advertiser and associated with a particular advertisement or group of advertisements, such as a campaign. For example, a company selling fishing tackle may have a line of large lures, and may thus identify terms such as "bait," "lunker," "sturgeon," and "muskie fever" as keywords to associate with its advertisements for such large lures.

Those advertisements may then be considered by the system for display when a search results are displayed to a user who enters such terms. The comparison may also be made between a search or query, and the text in an advertisement or the text in a target of a hyperlink in an advertisement, or to a combination of keywords, target text, and advertisement text, among other possible techniques. For example, the system may effectively select terms from an advertisement as key words so that the advertisement is selected for possible display when a search or other user action associated with the key words is submitted. An advertisement may be selected for possible display if there is a "near" match also, for example, if a query includes terms that are known synonyms or mis-typings/mis-spellings of the key word terms for an advertisement. The group of matching advertisements may be termed a candidate group.

Advertisements within the candidate group may be ranked, and particular advertisements may be selected for display, according to bid amounts offered by advertisers, by the suitability of the advertisement to the query or search terms, or by a combination of both factors. For example, the top-listed advertisement may be the advertisement in the candidate group associated with the highest advertiser submitted bid. The bid may be an amount submitted by an advertiser, such as when first registering a new advertisement with the system, that the advertiser has agreed to pay to the operator of the system if a particular event occurs. For example, the advertiser may agree to pay fifty cents every time a user clicks on a hyperlink or other object in their advertisement. Alternatively, the advertiser may agree to pay a certain amount if the user travels to a facility associated with an advertisement, or clicks to the advertiser's site and then performs a particular action at the site, such as a purchase transaction. The advertiser site may include code programmed to notify the system when such an event has occurred, or other mechanisms may be used by the system to make such a verification so that the advertiser's account may be debited accordingly.

When results are shown on an annotated map, the "order" of the results may be indeterminate, so that ranking simply involves selecting a limited number of advertisements that exceed a threshold of relevance. The threshold may use scoring factors the same as or similar to those for ordered ranking, including the percent of time that users travel to a location after being shown an advertisement, the percent of time users select a locale to obtain driving directions when shown an advertisement (perhaps adjusted by the frequency with which they actually follow or don't follow the directions to the locale), Advertisements selected only by offer price may not be the best advertisements for the system to run, however, if those advertisements are not relevant to users of the system. For example, if advertisements for cosmetics are shown every time the term "Harley Davidson" is entered, users are unlikely to select the advertisements, so that everyone is harmed: the information shown the user is less relevant, the lower-bidding (though perhaps highly relevant) advertisers are shut out from user traffic, the high-bidding advertiser receives very few visits, and the system is harmed as a result and cannot generate as much advertising-based revenue. The so-called "click through rate" will fall. Thus, any score given to an advertisement in a ranking process may be a combination of bid amount and relevance of the advertisement. The relevance may be determined by various methods, such as by inferring a high relevance for an advertisement with respect to a particular query if many users navigate through the advertisement after entering the query. In such a case, the popularity of the advertisement, as judged by its click-through rate (or drive-to rate), causes the advertisement to be displayed before or more prominently than other advertisements for which there may be higher bids. Such an approach causes more relevant advertisements to be presented to a user.

The weighting between relevance and bid amount may be adjusted as desired, and other factors may also be included, in producing a score for ranking each advertisement. The advertisements may then be positioned according to their score. Such ordering need not be linear, but may place advertisements according to the importance of particular positions in the advertising results, such as placing the highest scoring advertisement at the top of the results, and the second-highest scoring advertisement at the bottom of the results (if the bottom has been determined to generate more interest than has the second position from the top).

The advertisements to display (e.g., when displayed as icons on a map or as a list of results) and the order of the display (e.g., when displayed as a list of results) may be determined using a variety of factors, such as through a scoring process. For example, ratings of advertisements, the percent of time that users choose an advertisement when it is displayed, or the percent of time that users actually travel to a target when a corresponding advertisement is shown, may all be factors in a score for an advertisement. When employing user reactions to advertisements in order to score advertisements, the relevant reactions may relate to a particular user, to aggregated groups of users, or to both. For example, a user who constantly goes to Starbucks coffee shops may be shown Starbucks advertisements (including in icons) when they enter "coffee," whether they mention a brand or not. In a like manner, aggregated reactions may be based on different reactions including, selection of an advertisement or travel to a facility represented by an advertisement.

Although shown as two separate components, ad mixer 208 and ad servers 210 may be combined or may be implemented in various different forms using greater or fewer separate structures.

Information provider 202 may store in one or more databases various information relating to advertisements, their presentation, and user reactions to the advertisements. For example, an ad location database 212 may contain correlations between particular advertisements and facilities relating to the advertisements. The correlations may be direct, such as by identifying advertisements in a first field, and locations associated with the advertisements in a second field. The correlations may also be indirect, such as by identifying locations for a particular advertiser or advertisement group, and correlating the advertiser or the advertisement group to various locations. As shown, each advertisement may be associated with a single location such as for a small business, or for a plurality of locations such as for a restaurant chain or other similar, larger business. The locations may be represented in various appropriate manners, including by GPS or other latitude, longitude coordinates.

Ad servers 210 may draw upon ad location database 212 either to correlate the location of a user's device to a location or locations, to determine whether an advertiser should be charged for actions by the user, or to provide such location correlation information to a mobile device, which may in turn make such a determination. For example, ad servers 210 or ad mixer 208 may determine which advertisements to transmit to a remote device, and may in turn obtain location information for each of those advertisements. The location information may be forwarded to the remote device so that it may track the location of the remote device relative to locations identified in the location information. When the mobile device comes within an appropriate distance of any of the locations for an appropriate period of time, and within a sufficient immediacy after the advertisements have been displayed, the advertiser may be charged a pre-agreed amount for the user's activity.

Advertisements database 223 may store and provide advertisements in response to requests from ad servers 210 or other components of system 200. The advertisements may take various appropriate forms. For example, advertisements may simply be small graphical icons, several pieces of text such as snippets and URLs, images, videos, sound files, or other appropriate advertising formats. Ad servers 210 may determine the type of remote device that is requesting information, such as by reviewing heading information from a request, and may select a format for advertisements that are compatible with the particular mobile device. Ads database 223 may be accessed, as described in more detail below, by advertisers wishing to add or edit their inventory of advertisements, key words for the advertisements, schedules in which the advertisements are active, and other relevant information for advertisements and advertising campaigns.

Stats database 214 may contain various statistical information regarding advertisements that have been transmitted to users by information provider 202. For example, stored statistics may indicate how many times a particular advertisement was displayed to users, how many times users responded to the advertisement by selecting it or otherwise requesting additional information about the advertisement or the advertiser, or how many times a user came in close proximity to a location associated with the advertisement.

A user's location and direction when shown an advertisement may be variables that an advertiser can use to target advertisements, or they may be used by a statistical analysis system to select appropriate advertisements. For example, a user traveling on a road might be more likely to stop at locations on their right than on their left (at least on roads where one travels on the right side). An advertising system may then be able to use this signal to recognize a correlation between traveling direction and 'drive-to' rate. Similarly, advertisers may be willing to pay more to draw potential customers across the road to their establishment through an advertisement and/or other offering (such as a coupon).

Billing engine 220 may track user responses to advertisements and displays of advertisements, and may compute appropriate amounts to charge associated advertisers for such advertising activity. Billing engine 220 may access billing database 222, for example, to obtain information regarding the amount that a particular advertiser has agreed to pay for certain activities. Billing engine 220 may also access ad servers 210 to determine when and under what conditions particular user responses occur. For example, ad servers 210 or other appropriate structures may receive information from a mobile device indicating that a user stopped for a sufficient period of time within a sufficient distance of a facility associated with an ad that had been served recently, so that the system may trigger a charge to an advertiser account.

Upon receiving such a notification from ad servers 210, billing engine 220 may make a request to billing database 222 to determine an amount that an advertiser associated with the advertisement has agreed to pay for such responses. For example, an advertiser's agreement may indicate that the advertiser will pay $0.50 for each physical presence of a user at one of the advertiser's facilities. The agreed amount may be a single amount, or may vary based on factors such as whether the user changed direction after being presented with the advertisement to reach the advertiser's facility, whether the user subsequently purchased goods or services at the advertiser's facility (such as by comparing transactions on a user account associated with the user), and the time of day or content of a search corresponding to the presentation of an advertisement to a user. Other factors may also be used to vary the amount for which an advertiser is responsible when a user responds to an advertisement.

Billing front 218 may serve as a front end with advertisers for the billing system. For example, billing front 218 may generate content for web pages to be viewed by advertisers, such as forms for submitting advertisements, submitting bids for the display and/or reaction to those advertisements, submitting identification and financial information for the advertiser, and providing other necessary information for information provider 202 to serve advertisements for any advertiser and to charge the advertiser. Billing front 218 may also permit queries of billing database 222, such as to report to advertisers a number of times an advertisement or group of advertisements has been displayed, the number of times to which an advertisement or group of advertisements has been responded, and the amount currently charged for carrying a particular advertisement or advertisements.

Reports database 216 may store information regarding various reports that users may want to run on data stored at information provider 202. For example, reports database 216 may have a standard report showing individual and accumulated charged amounts for advertisements or advertising campaigns. The report may show particular advertisements organized in a hierarchical manner, and advertisers may expand or collapse groupings of advertisements to see individual advertisements and the charges for them, or to see accumulated totals across multiple advertisements. Various other types of reports may also be provided. When a user requests a report, billing front 218 may obtain information that defines the report from reports database 216 and may apply billing information from billing database 222 to the report.

Figure 3:
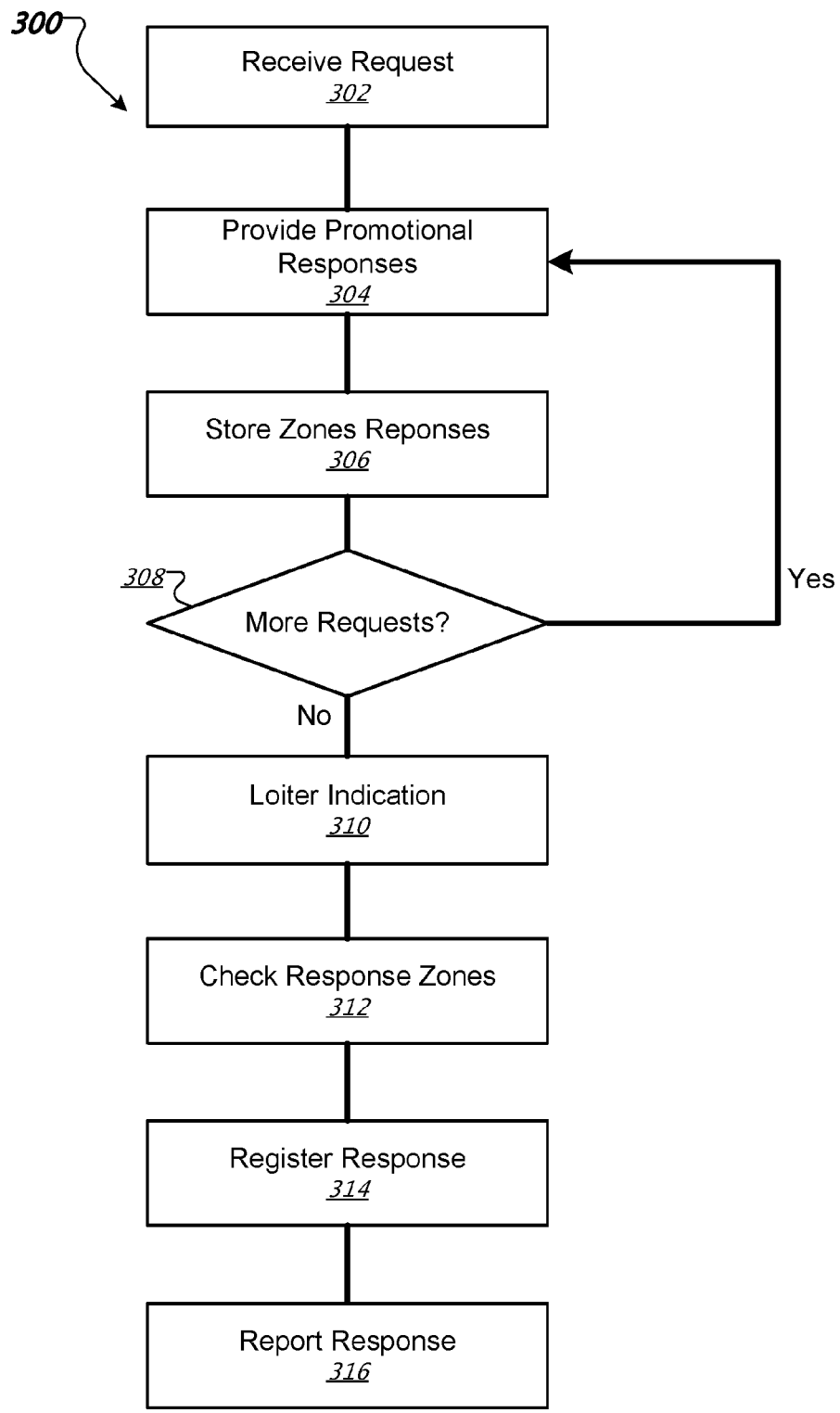
FIG. 3 is a flowchart showing actions for serving promotional material and tracking responses to the promotional material.

FIG. 3 is a flowchart 300 showing actions for serving promotional material and tracking responses to the promotional material. In general, the process involves supplying advertisements in response to a request associated with advertising material, tracking whether a device that presents the advertisement or advertisements lingers in an area near a facility associated with the advertisement (or navigates toward such a facility), and registers and reports responses if such an occurrence happens.

The method initially receives a request for information, such as a search request from a user or a request from a mobile device identifying a location of the mobile device (box 302). Promotional responses may then be provided in response to the request (box 304), and geographical zones or areas may be stored that are associated with the responses (box 306). The information about areas associated with the advertisements may be stored, for example, in a central system, or may be stored on a mobile system.

The method may then wait for further actions to occur. Among other possibilities, the actions may include other, or follow-up, requests from a user or the user's device, or the presence of the user in one of the geographic zones or areas associated with an advertisement shown to the user. At box 308, a user presents an additional request, such as by submitting a search query by speaking the query into a microphone in an automobile. The method then returns to provide additional promotional responses that match the new request, and identifies areas or zones associated with those responses, if applicable.

As the user/device moves, the method may periodically check the location of the user/device and compare that location to zones or areas associated with recently presented advertisements. At box 310, the method provides an indication that the user or device has lingered near or within a zone or area associated with one of the advertisements. Such a determination may be made, for example, if the user spends more than a predetermined amount of time, which may be a globally set amount of time, or may be an amount of time associated with a particular advertisement, inside the zone or area associated with a recently presented advertisement.

The "linger" determination may also be made independently of particular zones or areas. For example, the system may simply operate by waiting to determine the location of the user until the user has stopped for a predetermined period of time. In such a situation, after the determination that lingering is occurring has been made, the method may then check to determine whether the lingering occurred in an area associated with a recently presented advertisements. If such a determination is made, a response to the advertisement may be registered (box 314), and the response may be reported, such as back to a central information provider (box 316). Also, a "linger" determination may be made when a user follows the route of a path toward a facility presented by a navigation device sufficiently to indicate that the user is responding to an advertisement.

Where determinations about advertising areas are not made until a threshold determination has been made that a user or device has stopped moving sufficiently for a threshold time period, the linger indication may be determined on the mobile device, and a central system may determine whether the lingering occurred within a relevant area or is own associated with an advertisement. In such a situation, the mobile device, upon sensing a lingering condition, may transmit location information associated with the area where the lingering occurred, to a remote system, and the remote system may compare that area to areas associated with a particular advertisement. The locations associated with the advertisement may thus be transmitted to the mobile device, or may be capped at a central facility. Such information transfer may occur in near real-time if the device has a constant network connection, or may occur in batches if the network connection is intermittent.

Figure 4A:
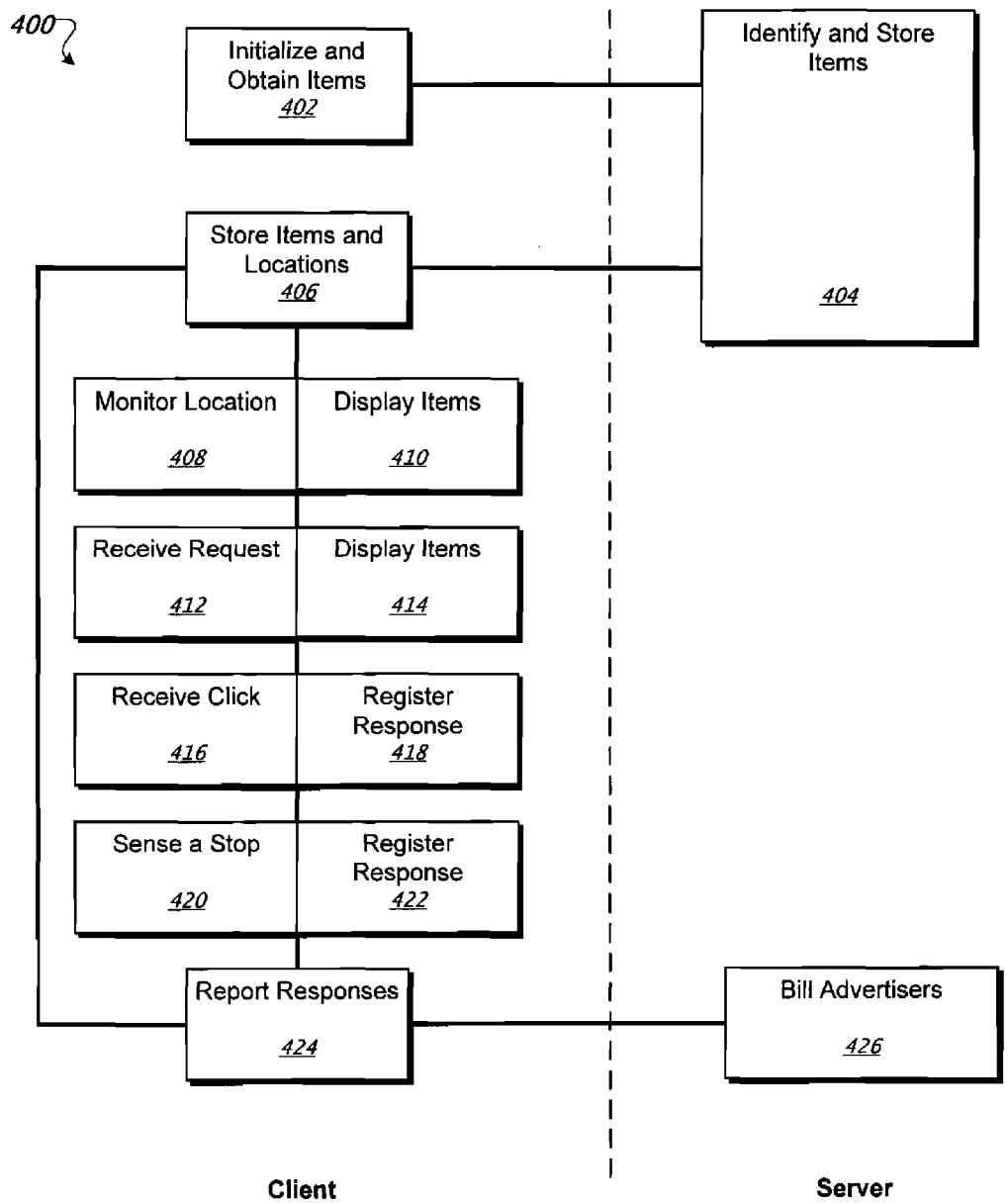
FIG. 4a is a swim lane diagram showing actions for serving pre-loaded promotional material and tracking responses to the promotional material.

FIG. 4a is a swim lane diagram 400 showing actions for serving pre-loaded promotional material and tracking responses to the promotional material. In general, this figure shows exemplary steps that may be taken by a client device and a server system in presenting advertisements, and in tracking user responses to the advertisements. In general, the process shown in the figure may be associated with a circumstance in which a mobile device obtains advertisements before a user has made a request associated with the advertisements, such as upon initialization of the device, e.g., the starting of a vehicle.

At step 402, the client device initializes and obtains advertising items. For example, a user may enter a vehicle and turn on the key, with the action turning on a vehicle navigation system. The vehicle navigation system may initially identify its location, such as in the garage of a homeowner, and may transmit that location to the server. With such a mechanism, the system can function when the user's device does not have an always-available network connection, but only a sporadic connection (such as a home WiFi network that communicates with a navigation system through a garage wall, or when the user travels into an area where wireless network connectivity is not available).

At step 404, the server identifies and serves items to the client. Such items may take various forms, such as traffic information, weather information, and recent news. The items may be formatted for display on a screen of a vehicle navigation system or for play over a radio of a vehicle. The items may be selected by the server based on a variety of factors. For example, location information received from the client may cause items associated with or near that location to be identified. Also, certain items may be identified as being appropriate for presentation at particular times of the day. For example, advertisements from a donut shop may be identified for presentation in the morning, while advertisements from a supper club may be identified for presentation in the evening.

In addition, the type of mobile device may be considered in selecting advertisements. For example, a navigation system may be assumed to be operated by someone who is more affluent than could be a mobile telephone, on average, so that advertisements generated for a more affluent demographic may be selected for display on such a system. Also, information about the device could provide evidence about the type of vehicle in which the display is mounted, and advertisements may be selected for such a vehicle. As one example, a certain brand or model of navigation device may be frequently found in tractor-trailer cabs, so that advertisements aimed at truckers could be returned to such a device, whereas a particular brand of vehicle navigation system may be found only in BMWs, so that particular targeted advertisement may be directed toward such a device.

Other demographic features may also be associated with particular brands or types of mobile devices, or by configuration information present in devices entered by the manufacturer, installer, or user. Such information could include vehicle year, make, and model, origin coordinates (such as the user's "home city" such that travelers might be distinguished from locals), favorite chains (restaurants, gas stations, coffee shops, etc), and preferences (e.g., show only restaurants that are vegan, allow smoking, etc).

At box 406, the client receives the items, and stores them along with location information associated with the items. Alternatively, the location information may be retained at the server. The method may then continually monitor the location of the device (box 408), and may display items associated with the state of the system. As a typical example, the facilities of advertisers around the vehicle or client may be shown on a map of a vehicle navigation system as the system moves through an area. At box 412, a user may provide a request to the client, such as a spoken search request. The client may identify which items from the items that were previously downloaded are a best match for the request, and may display them to a user (box 414) in appropriate circumstances. The client may also obtain items in response to such a search request by transmitting a request to the server.

After items have been displayed, whether as part of the normal operation of a system or in response to user requests, responses by the user to the advertisements may be determined. For example, at box 416 a client receives a so-called click on an advertisement. Such a click may include a verbal request from a user relating to the advertisement, a request to call the advertiser by the user, or another discernible response by a user to the advertisement. When a response is received, the response may be registered (box 418) with the client or the server. Parameters associated with the response may be useful in tracking the response for charging advertisers and for studying the operation of a system. As a result, the response may be registered (box 418), either on the client or as transmitted to the server. Along with registering the response, an advertiser account may be charged, or a charge may be delayed until the client reports back to the server with such information.

The method may also send other information if certain responses to an advertisement occur, such as a stopping of the client in one location or in a tightly spaced location for a period of time (box 420). For example, if a remote device stays in one location for more than 15 minutes, a system may assume that the user of the remote device has stopped in that location, has likely exited from a vehicle, and is addressing situations outside the vehicle. As one example, a user may have stopped to pick up dinner on the way home, and left a vehicle navigation system motionless in the parking lot. Small changes in position by the client may be determined to be inconsequential, and a "linger" determination may still be made. For example, where the client is in a mobile phone, the client can be expected to move around slightly even when its owner is inside a particular store. Likewise, for example, a vehicle navigation system may move slightly in the drive-through lane of a restaurant, yet such activity should be counted as a response to a corresponding advertisement.

At box 422, a response to an advertisement is registered. Such an action may occur after a linger is sensed and the client stays near the location of the linger for a predefined period of time. The registration of the response may include registering information such as an identifier for the client device, the length of time of the linger, the location of the linger, and other similar information.

At an appropriate time, the client may report all accrued registered responses (box 434). For example, a client device may be programmed to report into a server each day or at the occurrence of a particular happening. Such a report may include reports on a number of responses, or registrations associated with the stopping of the client in or near an area associated with a recently served advertisement. Certain lingers may be prevented from being associated with an advertisement, where the advertisement has not been presented in a sufficiently long time period. Such a expiration policy may ensure that random visits to a facility that have no connection to a long-ago presented advertisement do not result in a charge to the advertiser.

Finally, at box 426, the server receives the accrued responses, and charges each advertiser an agreed-upon amount if a sufficiently long linger was made in an area in or near an area associated with an advertisement.

Figure 4B:
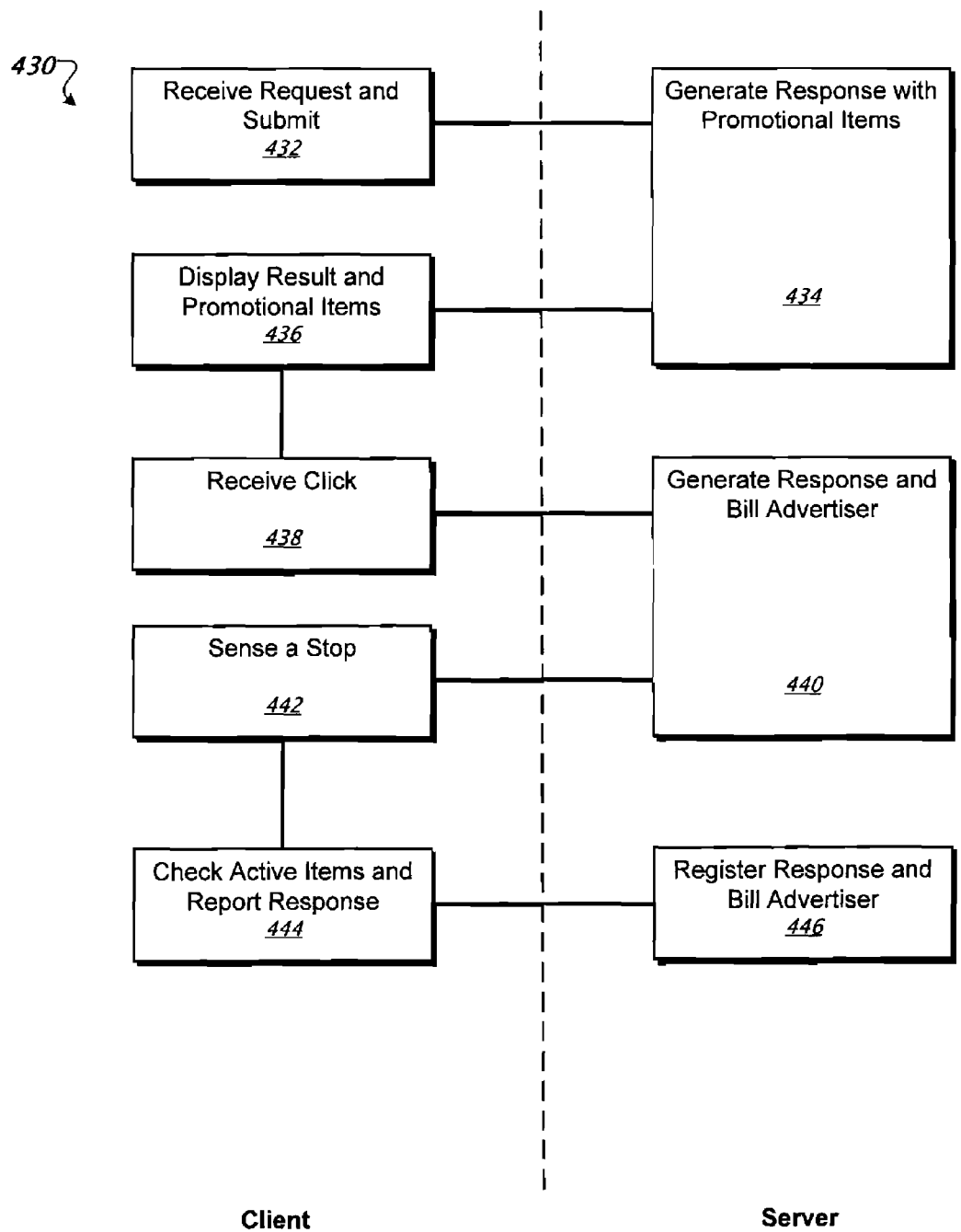
FIG. 4b is a swim lane diagram showing actions for serving responsive promotional material and tracking responses to the promotional material.

FIG. 4b is a swim lane diagram 430 showing actions for serving responsive promotional material, and tracking responses to the promotional material. As in FIG. 4a, a client is requesting information about advertisements and associated locations, and a server is returning such information. In FIG. 4b, however, the client makes an explicit request for information and an explicit follow-up request for information, and the server provides responsive information.

Starting at box 432, the client receives a request such as from a user, and submits the request to the server. For example, the request may include a number of search keywords such as "hamburger and fries." Additionally, the client may determine its present location, and may include information about that location with the request.

Upon receiving the information, and potentially additional metadata about the request (such as information about the client and about the client's location), the server may generate a response that includes promotional items (box 434). The response may also include search response information or other information requested by the user. The response may include "local" search results keyed to the received locational information. The response, including the promotional items (if the items are not already on the client), may be transmitted to the client, which may display them to a user or otherwise present them to a user (box 436).

After a user has received responses, they may make a selection (a selection event), e.g., by speaking a word associated with the advertisement (box 438). Such a selection may cause the client to make a second request from the server, such as to return additional information relating to the selected advertisement. Such information may also be obtained from the client if the information was, for example, obtained with the other items. The server may generate a response, such as a phone number for a particular advertiser facility, and may bill the advertiser for the click (box 440). Alternatively, or in addition, the client may generate directions for the user from their current location to a facility associated with the selected advertisement. The returned information may be absolute, such as a single identified telephone number for an advertiser, or may be relative, such as a telephone number for a particular facility in an area near the client, selected from among a number of telephone numbers associated with an advertiser.

Multiple telephone numbers may also be returned, such as where several facilities are in the vicinity of the client, or where the client is moving down a roadway and several facilities appear nearer the roadway in front of the moving client. For example, telephone numbers may be shown above multiple restaurant facilities in a common franchise on a vehicle navigation display, along with identifying numbers, such as "1" and "2," and a user may speak the word "one" or the word "two" to dial the appropriate selected facility.

At box 442, the client senses a linger, such as a lack of change in a global positioning system value or a change below a minimum threshold for a certain period of time. When such a linger occurs, the client may check its current location against promotional items that are active in the system, such as promotional items that have been presented in the previous thirty minutes. If an area associated with any of the active promotional items matches the location of the client, the client may report a response to indicate that a linger has been made at that location. If multiple advertisements match, neither advertiser might get charged, or an agreement may provide that each advertiser is charged one half an agreed rate or some other fraction of an agreed rate. Finally, at box 446 the server obtains information about active items where lingers have been made and registers such responses. The response or responses may include, for example, the return to the server of an "arrival code" that the server initially sent to the client with the advertisement. The arrival code may be correlated with the advertisement or advertiser at the server, and may serve as a convenient mechanism by which to easily determine when to charge an advertiser. The server may also charge or bill the appropriate advertisers a computed or predetermined amount for the actions by the user of the client device.

Advertisements may also be distributed by mechanisms other than those discussed above. For example, broadcast advertisement distribution may occur simultaneously to multiple mobile devices, such as via packet radio or over various underused portions of wireless spectrum. Alternatively, or in addition, advertisements may be distributed on physical media, such as CD, DVD, or flash memory. Such transfer may occur for example, as an adjunct to distribution of media such as music to a portable media player, and may then be synchronized with a mobile system when a user connects the media player in a vehicle. For example, a user may subscribe to certain podcasts or other services, and an information provider that supplies the podcasts may deliver related promotional content with the podcasts, and may include locational information with the promotional content. The media player, when played in the vehicle, may then display relevant advertisements and map graphics on a vehicle navigation system when the podcasts are played. As one example, while a podcast about a particular book is being played in a vehicle, the locations of bookstores that are part of an advertising network may be displayed on the vehicle navigation system so that a driver of the vehicle can easily purchase the book.

FIG. 5 is a schematic representation of a database 500 for tracking responses to advertisements. This exemplary database is shown in the form of a table having seven exemplary fields and nine records. As would be understood by a skilled artisan, such a database may take a variety of forms and have various numbers of fields and records. The particular fields shown here are intended to provide an indication of information that could be stored in one or more databases or database tables associated with the display of advertising and tracking of user responses to such advertising.

Ad ID field 502 contains a unique identification number for each advertisement in a system. Various tables in a database may use such an identification number to match and compare information about particular advertisements and to connect information in one table with information in another table. Impression timestamp field 504 may represent a time, in a standard format, at which an advertisement was presented to a user. Such a timestamp may be used to determine when the ad should no longer be active in determining whether a user's visit to a facility associated with the advertisement is actually made in response to the advertisement, and is not simply a random or coincidental visit.

Coordinates field 506 may store one or more latitude, longitude pairs identifying the location of a facility associated with a particular advertisement identifier. Such a location may be, for example, the center point of a retail store or restaurant. Radius field 508 represents the area around a coordinate that will trigger an indication that a mobile device has made a visit to the facility. A small business like a record store, for example, may have a very small radius, while a large businesses such as a lumberyard may have a very large radius. As explained in more detail above, the radius or other indicator of the size of a facility may be set in various manners, some of which may play a factor in the amount that an advertiser will have to pay when a system indicates that a visit has been made to an advertiser facility.

Stop time field 510 represents, in time units, the length of a stop, or linger, at a particular location. Alternatively, the field may simply represent that a stop was made or was not made, or the number of stops made, at such a facility. Active field 512 may be an optional field that indicates whether a particular advertisement is still active for a particular mobile device. Such a determination may be made by comparing the current time to the impression timestamp and making the value not active if the time exceeds a predetermined amount. In addition, an advertisement may be made inactive if the time of day does not match the identified time for presenting the advertisement. For example advertisements about breakfast may be restricted to the early morning hours. Finally, visit sealed may indicate whether a particular device made a visit to a particular location or facility associated with an advertisement. Such a determination may occur by comparing the coordinates of a particular facility with the coordinates of a stop and determining whether a stop time was sufficient to indicate that an actual visit was made.

Figure 6:
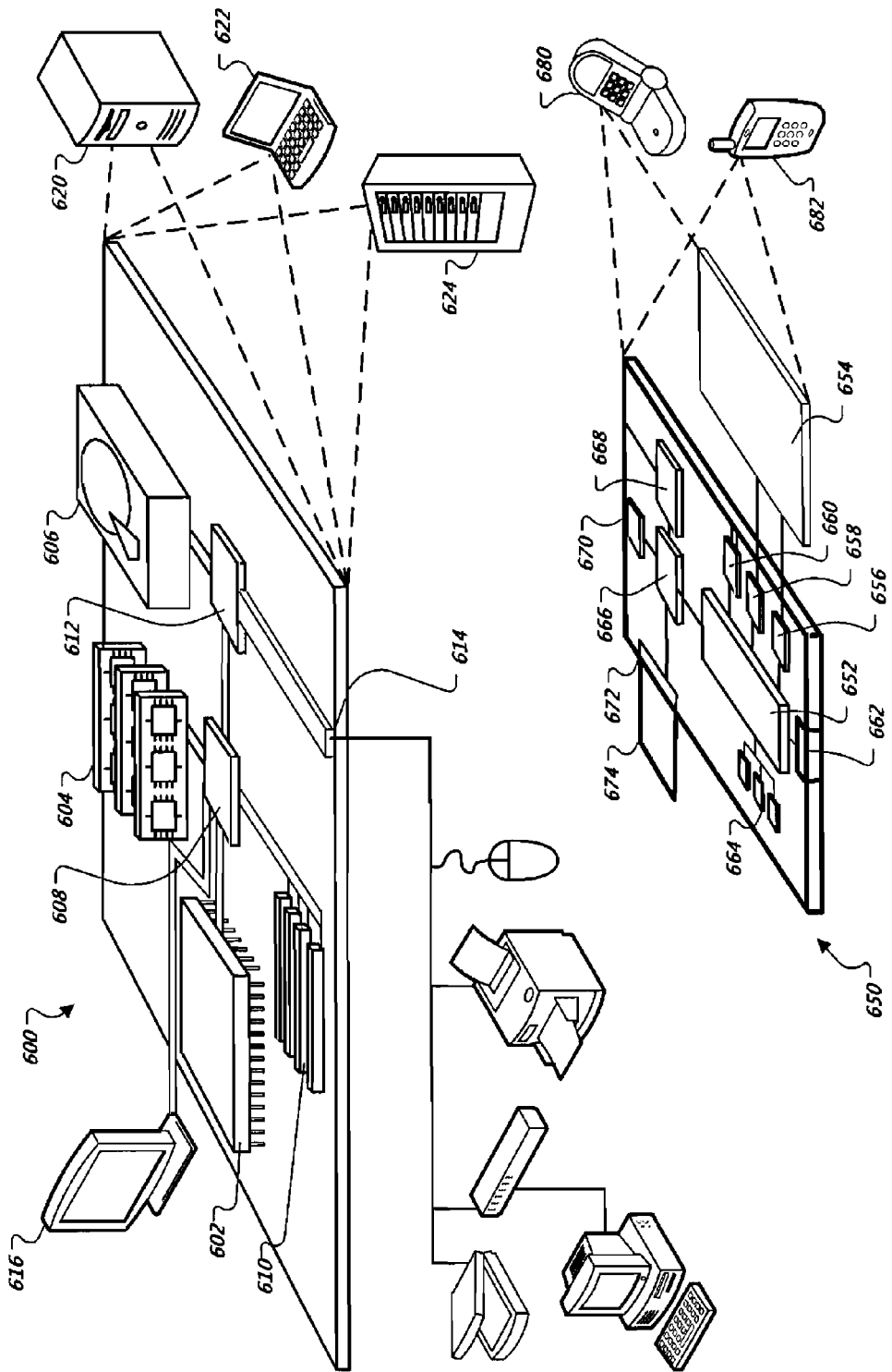
FIG. 6 shows schematic representations of two general computing systems.

FIG. 6 shows schematic representations of two general computing systems. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units.

Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of what is described here. For example, various forms of the flows shown above may be used, with steps re-ordered, added, or removed. Also, although several applications and methods have been described, it should be recognized that numerous other applications are contemplated. Accordingly, other embodiments are within the scope of the following claims.

What is claimed is:
1. A computer-implemented method comprising:
receiving data from a mobile device, the data identifying a first geographic location;
providing, to the mobile device, a promotional item based on the first geographic location, the promotional item being associated with a second geographic location;
determining that, as a result of a user of the mobile device selecting a representation of the promotional item, a navigational component of the mobile device has gen- erated directions for the user to follow to travel from the first geographic location to the second geographic location;

in direct response to determining that the mobile device has generated directions for the user to follow to travel from the first geographic location to the second geographic location, assigning a billing amount because the navigational component of the mobile device has generated directions for the user to follow to travel from the first geographic location to the second geographic location, wherein the assigning is performed independent of whether the user navigates toward or visits the second geographic location; and causing an advertising account to be charged the billing amount.

2. The method of claim 1, wherein the second geographical location comprises a region defined as a circle having a centerpoint and a radius or diameter.

3. The method of claim 1, wherein the first geographic location is a location of the mobile device.

4. The method of claim 1, wherein the mobile device comprises a vehicle navigation system.

5. The method of claim 1, wherein the promotional item is provided in response to a query by the user of the mobile device.

6. The method of claim 1, further comprising providing the directions to the second geographic location.

7. The method of claim 1, further comprising receiving a request from the device and providing the promotional item in response to the request, wherein the promotional item has a content relating to content of the request.

8. The method of claim 1, further comprising determining whether the mobile device generated the directions to the second geographic location within a determined time window after the promotional item was provided, and charging the advertising account based on the determining.

9. The method of claim 1, further comprising providing updated promotional items to the mobile device as the mobile device is determined to have moved geographically, the updated promotional items corresponding to a current location of the mobile device.

10. The method of claim 1, wherein assigning the billing amount comprises determining a distance between the first geographic location and the second geographic location.

11. The method of claim 1, wherein providing the promotional item to the mobile device includes providing a branded icon to appear in the second geographic location on a map displayed by the mobile device.

12. The method of claim 1, further comprising:
providing, to the mobile device and with the promotional item, an arrival code; and
receiving the arrival code from the mobile device,
wherein the billing amount is assigned based on receiving the arrival code.

13. The method of claim 1, further comprising:
determining that the second geographic location is within a threshold distance of the first geographic location; and
selecting the promotional item to provide to the mobile device in response to determining that the second geographic location is within the threshold distance.

14. The method of claim 1, wherein assigning a billing amount occurs when the mobile device actually arrives at the second geographic location.

15. The method of claim 1, wherein assigning a billing amount occurs before the mobile device arrives at the second geographic location.

16. The method of claim 1, wherein assigning a billing amount because the navigational component of the mobile device has generated directions for the user to follow to travel from the first geographic location to the second geographic location comprises:
assigning a billing amount only because the navigational component of the mobile device has generated directions for the user to follow to travel from the first geographic location to the second geographic location.

17. A system comprising:
a database storing a plurality of promotional items having associated geographic locations;
an advertising server that selects one or more promotional items in response to a request, wherein the promotional items are selected based on the content of the request and a geographic location associated with the request;
a navigation system adapted to present a promotional item selected by the advertising server and then generate directions for the user to follow to travel to a geographic location associated with the promotional item in response to the user selecting the promotional item; and
a billing engine adapted to, in direct response to the navigation system presenting the promotional item and then generating directions for the user to follow to travel to a geographic location associated with the promotional item, bill an entity associated with a promotional item because the navigation system presented the promotional item and then generated directions for the user to follow to travel to the geographic location associated with the promotional item, wherein the billing is performed independent of whether the user navigates toward or visits the second geographic location.

18. The system of claim 17, wherein the geographic locations are expressed as latitude/longitude pairs.

19. The system of claim 17, wherein one or more of the promotional items is associated with a plurality of geographic locations.

20. The system of claim 19, wherein the billing engine is adapted to bill the entity associated with the one or more promotional items associated with a plurality of geographic locations if the navigation system generates directions to any of the geographic locations in response to a user selecting the one or more promotional items.

21. The system of claim 17, wherein the geographic location associated with the request comprises a location of a user of the navigation system.

22. The system of claim 17, further comprising a mapping server configured to provide directions to a geographic location associated with a promotional item in response to a user's selection of the promotional item.

23. The system of claim 17, wherein the billing engine is adapted to bill an entity associated with a promotional item if the navigation system presents the promotional item and then generate directions to a geographic location associated with the promotional item, when the navigation system actually arrives at the geographic location.

24. The system of claim 17, wherein the billing engine is adapted to bill an entity associated with a promotional item if the navigation system presents the promotional item and then generate directions to a geographic location associated with the promotional item, before the navigation system actually arrives at the geographic location.

25. A computer-implemented method comprising:
providing an advertisement for presentation by a mobile electronic device;

sensing that the mobile device has generated directions for the user to follow to travel to a location associated with the advertisement in response to the user selecting the advertisement; and in direct response to sensing that the mobile device has generated directions for the user to follow to travel to the location associated with the advertisement, billing a sponsor of the advertisement because the mobile device generated directions for the user to follow to travel to the location associated with the advertisement, wherein the billing is performed independent of whether the user navigates toward or visits the second geographic location, wherein the sponsor is billed an amount that is selected from multiple possible amounts to bill for presenting the advertisement based on how the user is determined to have responded to the advertisement, the possible amounts including a first amount billed if the mobile device is not determined to have arrived at the location and a second different amount billed if the mobile device is determined to have arrived at the location.

* * * * *